(12) United States Patent
Piccardi et al.

(10) Patent No.: US 10,601,313 B2
(45) Date of Patent: Mar. 24, 2020

(54) ELECTRONIC DEVICE WITH A RECONFIGURABLE CHARGING MECHANISM

(71) Applicant: Micron Technology, Inc., Boise, ID (US)

(72) Inventors: Michele Piccardi, Cupertino, CA (US); Xiaojiang Guo, San Jose, CA (US); Qiang Tang, Cupertino, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/430,761

(22) Filed: Jun. 4, 2019

(65) Prior Publication Data

US 2019/0288598 A1 Sep. 19, 2019

Related U.S. Application Data

(63) Continuation of application No. 16/009,128, filed on Jun. 14, 2018, now Pat. No. 10,381,923, which is a continuation of application No. 15/693,300, filed on Aug. 31, 2017, now Pat. No. 10,090,759.

(51) Int. Cl.
*H02M 3/07* (2006.01)

(52) U.S. Cl.
CPC ..................... *H02M 3/07* (2013.01)

(58) Field of Classification Search
None
See application file for complete search history.

(56) References Cited

U.S. PATENT DOCUMENTS

| 4,849,661 | A  | 7/1989  | Bazes              |
|-----------|----|---------|--------------------|
| 5,301,097 | A  | 4/1994  | McDaniel et al.    |
| 5,602,794 | A  | 2/1997  | Javanifard et al.  |
| 5,732,039 | A  | 3/1998  | Javanifard et al.  |
| 5,767,735 | A  | 6/1998  | Javanifard et al.  |
| 5,969,565 | A  | 10/1999 | Naganawa           |
| 6,208,198 | B1 | 3/2001  | Lee                |
| 6,717,458 | B1 | 4/2004  | Potanin            |
| 7,439,794 | B2 | 10/2008 | Takeyama et al.    |
| 7,971,076 | B2 | 6/2011  | Barrenscheen et al.|
| 8,063,805 | B1 | 11/2011 | Eid et al.         |

(Continued)

FOREIGN PATENT DOCUMENTS

JP 2007318953 A 12/2007

OTHER PUBLICATIONS

International Application No. PCT/US2018/043332—International Search Report and Written Opinion, dated Oct. 30, 2018, 11 pages.

*Primary Examiner* — Jeffery S Zweizig

(74) *Attorney, Agent, or Firm* — Perkins Coie LLP

(57) ABSTRACT

An electronic device includes a reconfigurable charge pump including pump units that can be arranged differently for varying an output voltage generated by the reconfigurable charge pump; a pump regulator coupled to the reconfigurable charge pump, the pump regulator configured to monitor the output voltage and turn the reconfigurable charge pump on or off based on the output voltage; and an arrangement control mechanism coupled to the pump regulator, the arrangement control mechanism configured to control operation of the pump regulator based on the output voltage to generate arrangement control output, wherein the arrangement control output controls electrical connections between the pump units.

15 Claims, 7 Drawing Sheets

(56) References Cited

U.S. PATENT DOCUMENTS

| | | |
|---|---|---|
| 8,699,247 B2 | 4/2014 | Nguyen et al. |
| 9,019,002 B2 | 4/2015 | Standley et al. |
| 9,071,236 B1 | 6/2015 | Masferrer et al. |
| 9,350,233 B2 | 5/2016 | Katsumata |
| 9,354,645 B2 | 5/2016 | Priel et al. |
| 10,033,277 B2 | 7/2018 | Ripley et al. |
| 2007/0273430 A1 | 11/2007 | Akashi et al. |
| 2011/0204925 A1 | 8/2011 | Barrenscheen et al. |
| 2012/0154022 A1 | 6/2012 | Cazzaniga et al. |
| 2012/0249095 A1 | 10/2012 | Zhao et al. |
| 2014/0091773 A1 | 4/2014 | Burlingame et al. |
| 2014/0266010 A1 | 9/2014 | Newlin et al. |
| 2015/0236583 A1 | 8/2015 | Ripley et al. |
| 2015/0311795 A1 | 10/2015 | Yang et al. |
| 2015/0372592 A1 | 12/2015 | Floyd |
| 2016/0181917 A1 | 6/2016 | Jantti et al. |
| 2019/0068052 A1 | 2/2019 | Piccardi et al. |

ELECTRONIC DEVICE WITH A RECONFIGURABLE CHARGING MECHANISM

RELATED APPLICATION(S)

This application is a continuation of U.S. application Ser. No. 16/009,128, filed Jun. 14, 2018; which is a continuation of U.S. application Ser. No. 15/693,300, filed Aug. 31, 2017, now U.S. Pat. No. 10,090,759; which is incorporated herein by reference in its entirety.

TECHNICAL FIELD

The disclosed embodiments relate to electronic devices, and, in particular, to semiconductor devices with a reconfigurable charging mechanism.

BACKGROUND

Electronic devices, such as semiconductor devices, memory chips, microprocessor chips, and imager chips, can include a charge pump (e.g., a DC to DC converter that functions as a power source) to create a voltage different (e.g., higher or lower) than the available source voltage (e.g., Vdd). Charge pumps can include components (e.g., diodes, switches, comparators, capacitors, resistors, or a combination thereof) that are organized to provide an output voltage that is boosted or reduced from an incoming source voltage.

Some charge pumps (e.g., reconfigurable charge pumps) can include the components arranged in units or stages, such that the connections between or relative arrangements of the units can be reconfigured in real-time to adjust one or more capabilities of the charge pump. FIG. 1A, illustrates a single stage of a charge pump in an electronic device 101. In a pre-charge phase, an energy storage structure (e.g., one or more capacitors) in the single stage can be charged using a voltage supply (e.g., providing a voltage level of '$V_{in}$'). As illustrated in FIG. 1B, the charged storage structure can be reconfigured (e.g., using one or more relays or switches) from a parallel connection with the voltage supply for the pre-charge phase to a series connection with the voltage supply for a boost phase. Accordingly, a resulting output (e.g., '$V_{out}$') can be higher (e.g., '$2V_{in}$') than the voltage level of the supply (e.g. '$V_{in}$').

The output voltage can be used to drive a load as illustrated in FIG. 1C. The boosted output can be connected to the electrical load. The load can have a current (e.g., as represented '$I_{load}$') and/or a capacitance level (e.g., as represented by a capacitance '$C_{load}$'). As such, when the load is connected to the charge pump, the output voltage (e.g., '$V_{out}$') can drop according to the pump capability. Accordingly, multiple units or stages can be connected in series or in parallel to provide and/or maintain a targeted level of voltage, current, power, etc. to the connected load.

As illustrated in FIG. 1D, the electronic device 101 can include a reconfigurable charge pump 102, a pump regulator 104 (e.g., a mechanism, such as a software or firmware module, circuitry, or a combination thereof), firmware 130, or a combination thereof. The reconfigurable charge pump 102 can include pump units 106 (e.g., groupings or stages of components or circuits configured to produce or contribute to a level of output voltage ("$V_{out}$")) that can be configured in series (e.g., in stages) or parallel (e.g., array configuration) connections relative to each other. For example, the pump units 106 can be configured or connected (e.g., using switches or relays) to form a series set 108 (e.g., a set of stages of the pump units 106 that are connected electrically in series), or a parallel set 110 (e.g., a set of arrays of the pump units 106 or the series sets that are connected electrically in parallel). A stage count 112, shown as 'N' in FIG. 1D, can represent a quantity of the pump units 106 within each of the series set 108. An array count 114, shown as 'M' in FIG. 1D, can represent a quantity of the pump units 106 or the series sets connected in parallel within the parallel set 110.

The pump regulator 104, the firmware 130, or a combination thereof can control the reconfigurable charge pump 102, such as by commanding the reconfigurable charge pump 102 to turn on or off. Further, the firmware 130 can be configured to control the reconfigurable charge pump 102, such as by configuring the pump units 106 in the reconfigurable charge pump 102. The firmware 130 can adjust the stage count 112 and the array count 114 (e.g., where the stage count 112 and the array count 114 are inversely proportionate) to adjust the output voltage. For example, the firmware 130 can configure the reconfigurable charge pump 102 to have the pump units 106 connected individually and with a number of arrays equal to a product between 'N' and 'M' (e.g., 1 stage by N·M arrays). Also for example, the firmware 130 can configure the reconfigurable charge pump 102 as the series set 108 including 2 stages and further connected with the number of arrays reduced by a factor of 2 (e.g., 2 stages by (N/2)·M arrays). Also for example, the firmware 130 can configure the reconfigurable charge pump 102 as the series set 108 including 4 stages and further connected with the number of arrays further reduced by a factor of 2 (e.g., for a 4 stage by (N/4)·M arrays). The firmware 130 can increase the stage count 112 (e.g., also decreasing the parallel set 110) to increase a maximum possible the output voltage ("$V_{max}$"), where the maximum would be increased in proportion to the stage count 112 (e.g., $V_{max}=V_{in}(1+N)$).

As illustrated in FIG. 2, output current (e.g., as illustrated by linear solid lines) and power efficiency (e.g., as illustrated by dotted curves) can be affected by controlling connections or configurations of the reconfigurable charge pump 102 (e.g., corresponding to increasing the output voltage). For example, the output current (e.g., $I_{eff}$, approximated by 1/[N+1]) can decrease in a linear pattern as the output voltage increases, and the slope of the linear pattern can decrease as the number of series connections increase (e.g., thereby increasing the maximum for the voltage output). The output current can be a function of effective output resistance of the pump ("$R_{out}$"), which is a function of the stage count 112, clock frequency, and capacitance level (e.g., such as for $R_{out}=N/[f_{clk} \cdot C_p]$). Also for example, the power efficiency (e.g., $P_{eff}=(I_{eff} \cdot V_{out})/V_{in}$) can behave as a convex curve, where the power efficiency decreases after a certain level of the output voltage. Further, the maximum level of the power efficiency reduces as the number of series connections increase. As such, for low levels of the output voltage, decreasing the stage count 112 improves the output current and the power efficiency.

DETAILED DESCRIPTION

The technology disclosed herein relates to electronic devices (e.g., semiconductor-level devices, sets of analog circuitry components, etc.), systems with electronic devices, and related methods for operating electronic devices in association with reconfigurable charge pumps. The electronic devices can include an arrangement control mechanism (e.g., implemented as a finite state machine) that can operate a pump regulator (e.g., a mechanism that can operate in a regulation mode to turn the charge pump on or off) in an arrangement control mode for controlling a configuration or a connection of pump units within the reconfigurable charge pumps.

For example, the pump regulator can include a comparator that compares an output voltage of the reconfigurable charge pump against a reference voltage level. For the regulation mode (e.g., such as in previously known charge pump designs), the pump regulator can turn the reconfigurable charge pump on or off based on a result of the comparison. In addition to the regulation mode, the arrangement control mechanism can implement the arrangement control mode and control the reference voltage level (e.g., based on connecting to different voltage sources) to generate arrangement control outputs (e.g., signals or states for the reconfigurable charge pump to maintain the current configuration, increase a number of stages or series connections, or decrease the number) using the comparator. As such, the arrangement control mechanism and the existing pump regulator can control the internal configuration of the reconfigurable charge pump without using firmware, thereby freeing up the firmware to provide increased processing capability for the electronic device.

Figure 3:
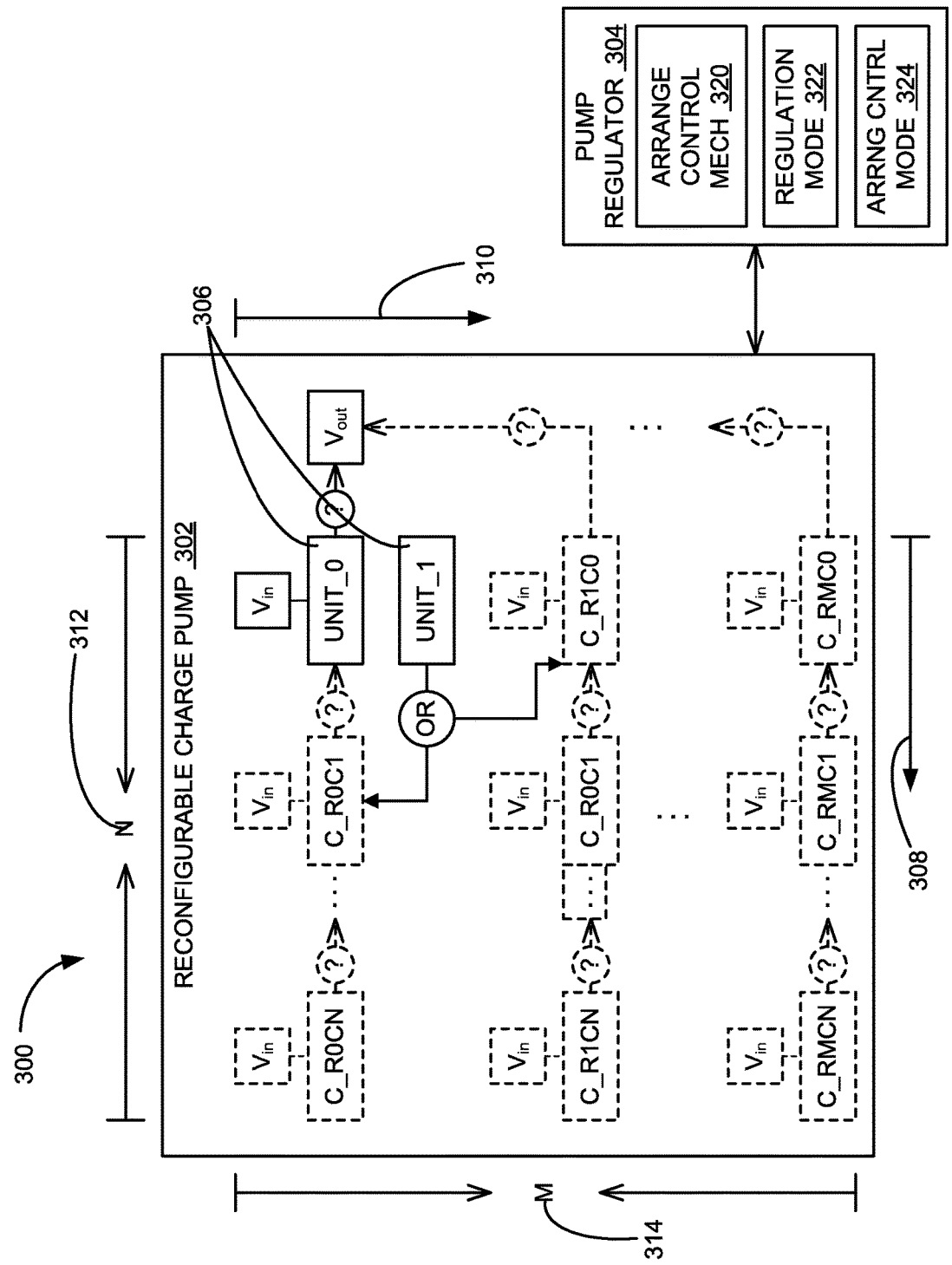
FIG. 3 is a block diagram of an electronic device with a reconfigurable charging mechanism in accordance with an embodiment of the present technology.

FIG. 3 is a block diagram of an electronic device 300 with a reconfigurable charging mechanism in accordance with an embodiment of the present technology. The electronic device 300 (e.g., a semiconductor device, an integrated circuit, a wafer or silicon level device, a set of digital and/or analog circuitry, etc.) can include a reconfigurable charge pump 302 (e.g., a DC to DC converter, including one or more capacitors to store energy, that functions as a power source using various different internal configurations, arrangements, or electrical connections to provide an output voltage ("$V_{out}$")) and a pump regulator 304 (e.g., a hardware circuit configured to control the reconfigurable charge pump 102).

For example, the reconfigurable charge pump 302, similar to the reconfigurable charge pump 102 of FIG. 1, can include pump units 306 (e.g., groupings of components or circuits each configured to produce or contribute to a level or a portion of the output voltage) that can be configured in series (e.g., in stages) or parallel (e.g., array configuration) to generate the output voltage. The pump units 306 can be configured or connected (e.g., using switches or relays) to form a series set 308 (e.g., a set of stages of the pump units 306 connected in series), a parallel set 310 (e.g., a set of arrays of the pump units 106 or the series sets connected in parallel to each other). A stage count 312, shown as 'N' in FIG. 3, can represent a quantity of the pump units 106 connected in series. An array count 314, shown as 'M' in FIG. 3, can represent a quantity of the pump units 306 or the series sets connected in parallel.

The pump regulator 304 can turn the reconfigurable charge pump 302 on or off to generate or maintain the output voltage. Further, the pump regulator 304 can further be reconfigured to control the internal electrical connections between the pump units 106 (e.g., thereby controlling an arrangement, a configuration, a size, or a combination thereof for the stages and arrays). For example, the pump regulator 304 can adjust the stage count 112 and the array count 114 similarly as discussed above to adjust the output voltage. While the electronic device 300 can include firmware, similar to the firmware 130 of FIG. 1, the function of controlling the internal electrical connections can be performed by the pump regulator 304 instead of the firmware. Accordingly, using the pump regulator 304 to control the number of stages provides increased processing capacity for the electronic device 300, such as by freeing up the firmware to process other functions instead of controlling the number of stages.

The reconfigurable charge pump 302, the pump regulator 304, or a combination thereof can operate according to an arrangement control mechanism 320. The arrangement control mechanism 320 is a method, a circuit, a process, a set of rules or instructions, or a combination thereof (e.g., a finite state machine (FSM)) configured to operate the reconfigurable charge pump 302, the pump regulator 304, or a combination thereof according to a regulation mode 322 or an arrangement control mode 324. In the regulation mode 322, the pump regulator 304 can operate to turn the reconfigurable charge pump 302 on or off. In the arrangement control mode 324, the pump regulator 304 can operate to control the number of stages (e.g., internal electrical connections between the pump units 106).

Figure 4:
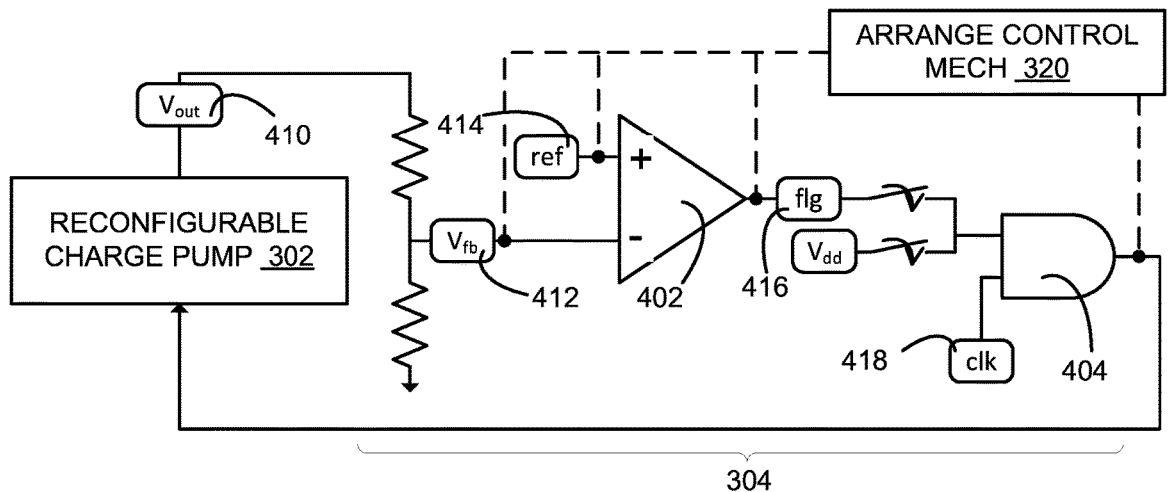
FIG. 4 is a schematic diagram of an electronic device in accordance with an embodiment of the present technology.

FIG. 4 is a schematic diagram of an electronic device in accordance with an embodiment of the present technology. The electronic device 300 of FIG. 3 can include the reconfigurable charge pump 302 electrically coupled to the pump regulator 304.

In some embodiments, the pump regulator 304 can include a comparator 402 and a conditional controller 404. As an input, the comparator 402 can have an output voltage 410 or a derivation thereof (e.g., a scaled level of the output voltage 410, such as a monitor level 412 ("$V_{fb}$") accessed through a voltage divider) generated by the reconfigurable charge pump 302. The comparator 402 can be configured to compare the output voltage 410 (e.g., through the monitor level 412 derived from the output voltage 410 as illustrated in FIG. 4) to a threshold level based on a reference level 414 ("ref") and generate a comparator flag 416 ("flg"). For example, the comparator 402 can generate the comparator flag 416 (e.g., as a logical value '1') when the reference level 414 exceeds the monitor level 412.

In the regulation mode 322 of FIG. 3, the pump regulator 304 can operate the comparator 402 to generate the comparator flag 416 according to the reference level 414 that is fixed for comparing the output voltage 410 to a target level. For example, the comparator flag 416 can be passed to the conditional controller 404 (e.g., an AND gate) as an input, along with a clock input 418, to generate a control signal for operating the reconfigurable charge pump 302 in an on-state (e.g., for a logical '1' output from the conditional controller 404) or an off-state (e.g., logical '0' output from the conditional controller 404).

In the arrangement control mode 324 of FIG. 3, the pump regulator 304 can operate the reconfigurable charge pump 302 in the on-state (e.g., based on keeping the clock input high or in a logical value '1'), such as for supporting a connected load that required the pump to turn on. The pump regulator 304 can further operate the comparator 402 to generate the comparator flag 416 according to the reference level 414 that is adjusted for a specific electrical connection (e.g., the stage count 312 of FIG. 3).

For example, the reference level 414 can be adjusted (e.g., according to or by the arrangement control mechanism 320) based on one or more threshold levels that correspond to the stage count 312 associated with current or real-time state of the reconfigurable charge pump 302. The electronic device 300 can include a set of thresholds (e.g., pairs of threshold levels each associated with a specific value of the stage count 312) predetermined according to a desired maximum voltage output, maximum number of stages, crossing points, or a combination thereof (e.g., based on behaviors or traits illustrated in FIG. 2). The electronic device 300 can select or adjust the stage count 312 (e.g., based on an arrangement control signal generated as an output from the arrangement control mechanism 320) according to the comparator flag 416, representing a result from comparing the monitor level 412 to the reference level 414 corresponding to the stage count 312 in operation, and the reference level 414 used for the comparison.

Figure 1C:
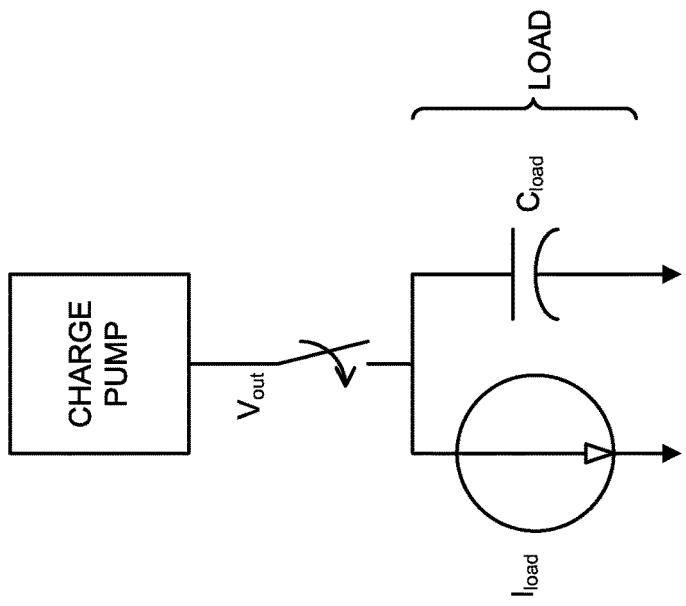
FIGS. 1A-D are block diagrams of an electronic device including a reconfigurable charging mechanism.
Figure 1B:
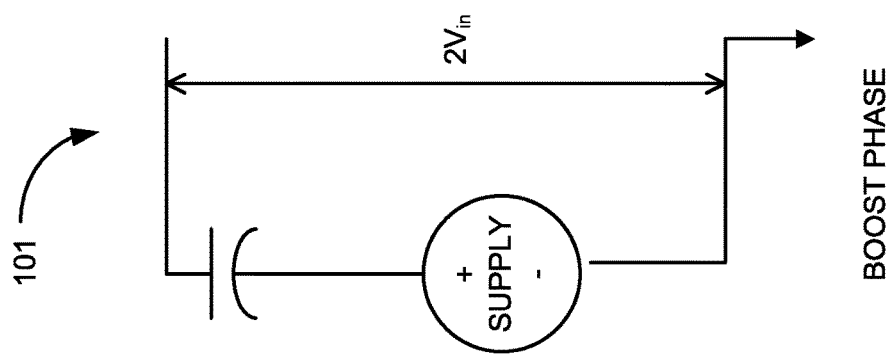
Figure 1A:
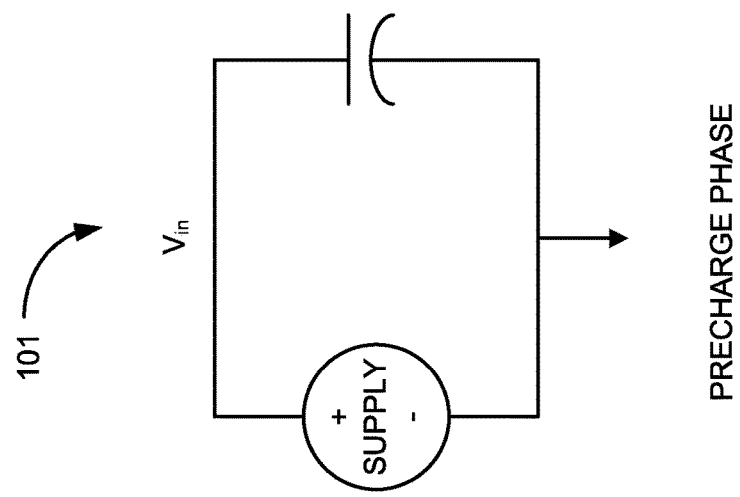
Figure 1D:
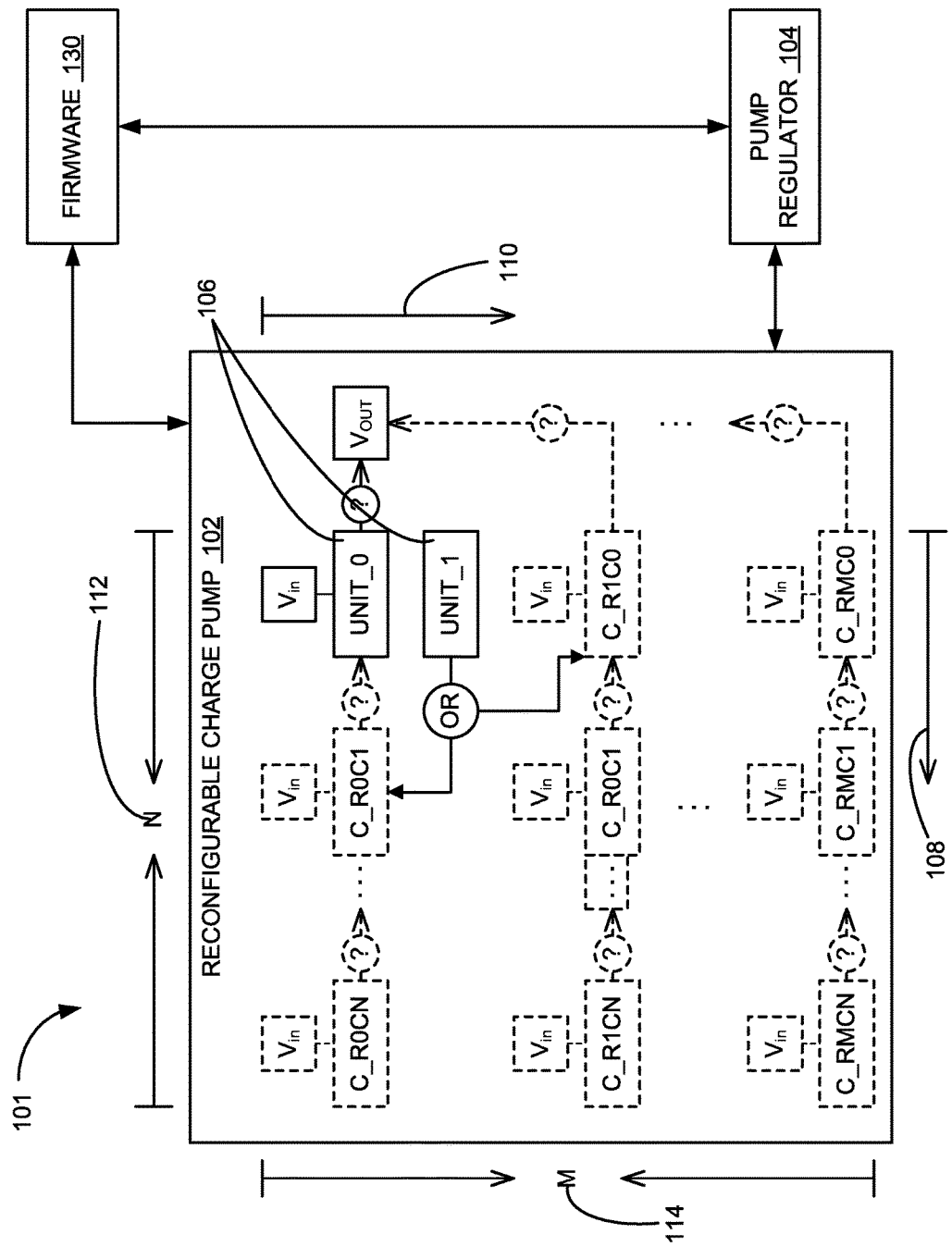
Figure 2:
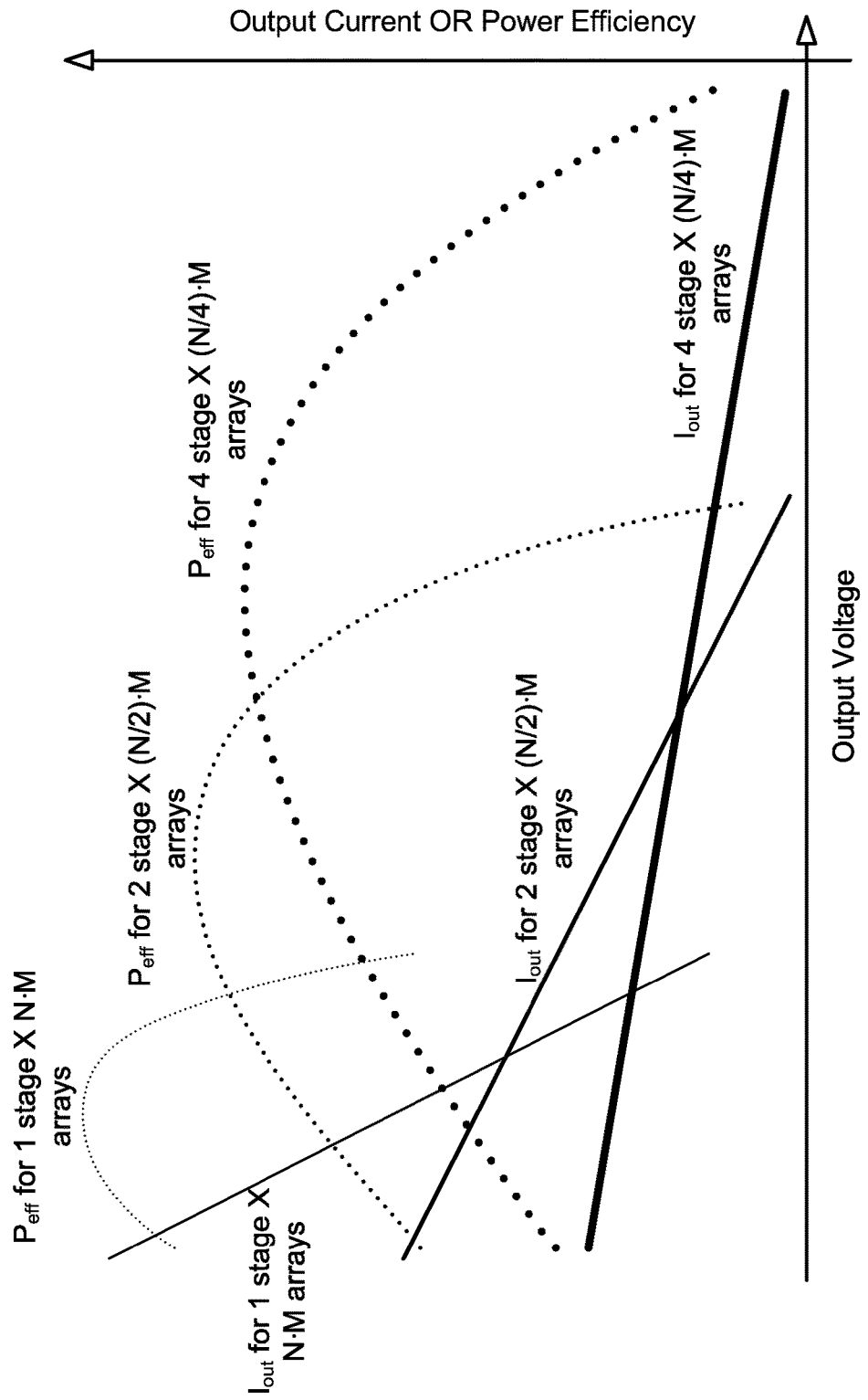
FIG. 2 is a graphical representation of a relationship of output voltage levels with output current levels and power efficiency levels for multiple configurations of an electronic device.

Adjusting the reference level 414 according to the stage count 312 and the output voltage 410 provides increased efficiency in generating the output voltage 410. The reference level 414 can reflect the threshold levels for evaluating the output voltage 410. Base on the real-time evaluation, the number of stages can be adjusted to maximize the output current and/or the power efficiency (e.g., such as illustrated in FIG. 2). Further, the efficiency can be provided using the arrangement control mechanism 320 (e.g., a finite state machine (FSM)) to reconfigure or repurpose the pump regulator 304 instead of adding a dedicated circuit to monitor and control the number of stages.

Figure 5:
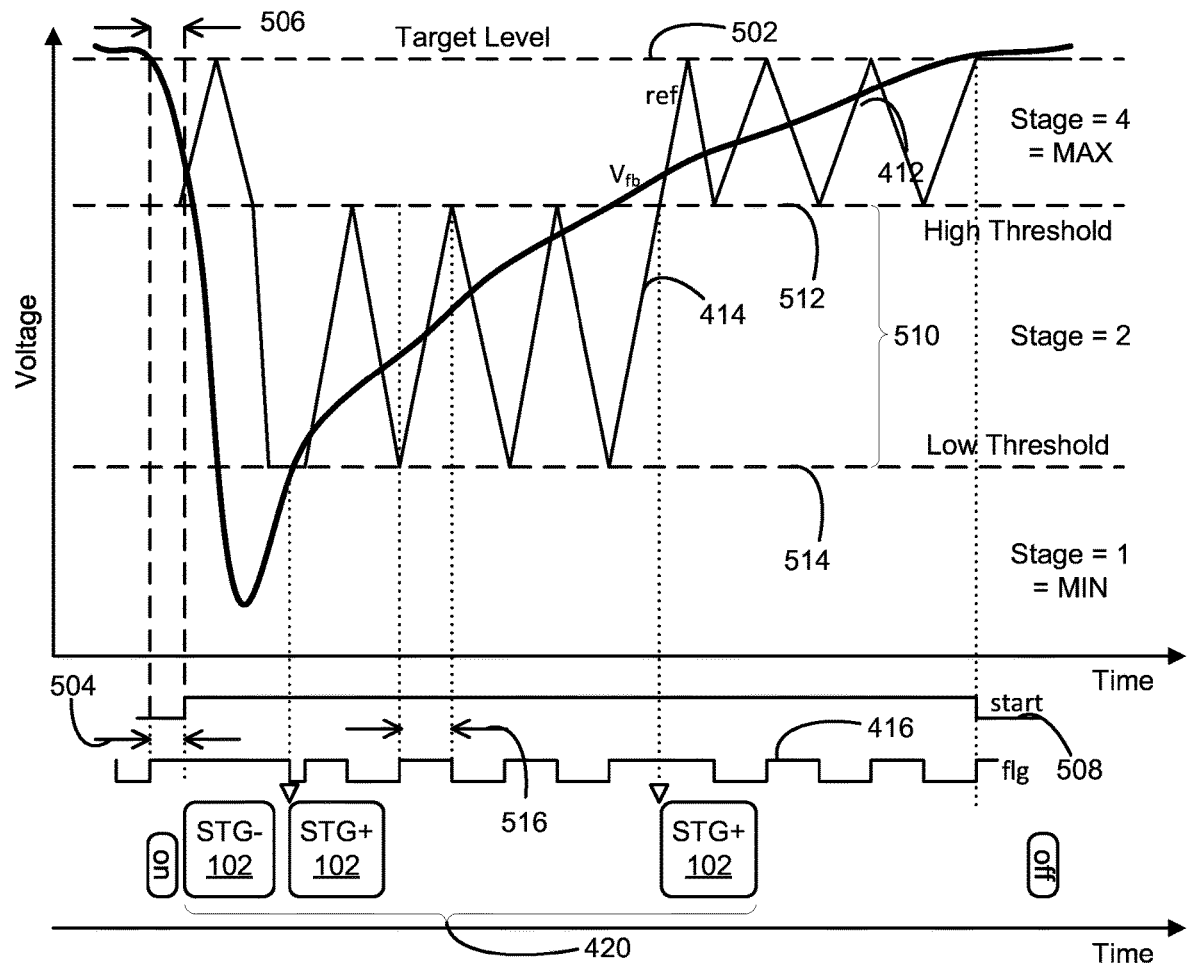
FIG. 5 is a timing diagram for an electronic device in accordance with an embodiment of the present technology.

FIG. 5 is a timing diagram for an electronic device in accordance with an embodiment of the present technology. The timing diagram can illustrate an example method of operation for the electronic device 300 of FIG. 3.

The electronic device 300 (e.g., the reconfigurable charge pump 302 of FIG. 3 and/or the pump regulator 304 of FIG. 3) can operate in the regulation mode 322 of FIG. 3 to provide and/or maintain the output voltage 410 of FIG. 4. For example, the pump regulator 304 can use the comparator 402 to evaluate the monitor level 412 and turn the reconfigurable charge pump 302 on or off to provide and/or maintain the output voltage 410 at or above a target level 502. The pump regulator 304 can set the reconfigurable charge pump 302 to operate in the on-state when the monitor level 412 falls below the target level 502.

For the purposes of reconfiguring the stages, the electronic device 300 (e.g., using the arrangement control mechanism 320 of FIG. 3, the reconfigurable charge pump 302, the pump regulator 304, a separate circuit or mechanism, or a combination thereof) can begin tracking (e.g., by initiating or starting a counter or a clock) an initial duration 504 for representing a duration that the reconfigurable charge pump 302 has remained in the on-state. The electronic device 300 can compare the initial duration 504 to an initial time window 506 (e.g., a predetermined time threshold representing a loading condition) and issue a reconfiguration output 508 (e.g., a signal or a command for initiating and/or enabling the reconfiguration process to adjust the connections between the pump units 306 of FIG. 3, such as the arrangement control signal). For example, when the reconfigurable charge pump 302 remains on longer than the initial time window 506, it can be assumed that a load has been attached or initiated, thereby utilizing the output voltage 410 and/or drawing associated current. As a result of the load, the output voltage 410 can be reduced (e.g., as a result of depleting stored charges on capacitors within the reconfigurable charge pump 302). Based on the loading condition, the reconfigurable charge pump 302 can remain in the on-state (e.g., input to the AND gate can be fixed high based on the reconfiguration output 508, such as based on switching in the vcc level, thereby allowing the clock input 418 of FIG. 4 to fully pass the AND gate and reach the pump without deformations). Accordingly the reconfiguration output 508 can change the reconfigurable charge pump 302, the pump regulator 304 or a combination thereof from operating in the regulation mode 322 to operating in the arrangement control mode 324 of FIG. 3.

In the arrangement control mode 324, the reconfigurable charge pump 302, the pump regulator 304, or a combination thereof can operate differently. For example, the reconfigurable charge pump 302 can use the output signal from the pump regulator 304 to increase or decrease the stage count 312 instead of an off or an on command. Also for example, the pump regulator 304 can evaluate the output voltage 410 (e.g., through the monitor level 412) with respect to the stage count 312 used to generate the output voltage 410. The reconfigurable charge pump 302, the pump regulator 304, the arrangement control mechanism 320, or a combination thereof can decrease the stage count 312 when the output voltage 410 falls below a certain level for the stage count 312 and increase the stage count 312 when the output voltage 410 rises above a certain level for the stage count 312.

For evaluating the output voltage 410, the pump regulator 304, the arrangement control mechanism 320, or a combination thereof can adjust the reference level 414 according to a threshold set 510. The threshold set 510 can include a set (e.g. pairings) of threshold levels that correspond to each possible value of the stage count 312. For example, the threshold set 510 can include a high threshold 512 and a low threshold 514 (e.g., predetermined levels associated with a voltage range, an efficiency, a current output, or a combination thereof) corresponding to each value of the stage count 312. The thresholds can correspond to an intersection between output voltage-current characteristics (e.g., as illustrated by straight lines in FIG. 2) of different stage counts. For example, the low threshold 514 illustrated in FIG. 5 can correspond to the output voltage level for the intersection between a current output characteristic of 1 stage configuration (e.g., "$I_{out}$ for 1 stage X N·M arrays") and that of a 2 stage configuration ("$I_{out}$ for 2 stage X (N/2)·M arrays") in FIG. 2. The high threshold 512 illustrated in FIG. 5 can correspond to the output voltage level for the intersection between a current output characteristic the 2 stage configuration and that of a 4 stage configuration ("$I_{out}$ for 4 stage X (N/4)·M arrays") in FIG. 2.

The pump regulator 304, the arrangement control mechanism 320, or a combination thereof can adjust the reference level 414 according to the high threshold 512 and the low threshold 514 based on the stage count 312 being utilized to generate the output voltage 410. In some embodiments, the pump regulator 304, the arrangement control mechanism 320, or a combination thereof can adjust the reference level 414 between the high threshold 512 and the low threshold 514 according to a regular time interval (e.g., a threshold update window 516).

For example, the pump regulator 304, the arrangement control mechanism 320, or a combination thereof can initially load or access a first pair of the high threshold 512 and/or the low threshold 514 for the maximum number of the stage count 312 upon changing to the arrangement control mode 324. When the monitor level 412 is below the low threshold 514 (e.g., for the loading condition), the pump regulator 304, the arrangement control mechanism 320, or a combination thereof can adjust the connections between the pump units 306 within the reconfigurable charge pump 302 and decrease the stage count 312. Based on decreasing the stage count 312 (e.g., from N=4 to N=3), the pump regulator 304, the arrangement control mechanism 320, or a combination thereof can load or access a second (e.g., next subsequent) pair of the high threshold 512 and the low threshold 514 for the corresponding number of the stage count 312.

For subsequent comparisons, the pump regulator 304, the arrangement control mechanism 320, or a combination thereof can similarly decrease the stage count 312 and update the thresholds when the monitor level is below the low threshold 514 (e.g., the comparator flag 416 is high with the reference level 414 corresponding to the low threshold 514). When the monitor level 412 is above the high threshold 512 at any point (e.g., the comparator flag 416 is low with the reference level 414 corresponding to the high threshold 512), the pump regulator 304, the arrangement control mechanism 320, or a combination thereof can increase the stage count 312 (e.g., based on adjust the connections between the pump units 306) and load/access the corresponding set of thresholds.

In some embodiments, the high threshold 512 and the low threshold 514 can overlap for sequential stage counts. As illustrated in FIG. 3 for the reconfigurable charge pump 302 with a maximum limit of 4 for the stage count 312, the high threshold 512 for the stage count 312 of 1 can be the same level as the low threshold 514 for the stage count 312 of 2. Similarly, the high threshold 512 for the stage count 312 of 2 can be the same level as the low threshold 514 for the stage count 312 of 4. Also, the high threshold 512 for the stage count 312 of 4 (e.g., the maximum possible value of the stage count 312 for the reconfigurable charge pump 302) can be the target level 502.

The reference level adjustment and comparison, switching between thresholds, and connection adjustments can continue until the monitor level 412 exceeds the high threshold 512 for the maximum number of the stage count 312 (e.g., N=MAX and $V_{fb}$ is greater than or equal to the high threshold 512, which equals the target level 502). When the monitor level 412 exceeds the target level 502, the reconfigurable charge pump 302, the pump regulator 304, or a combination thereof can change from the arrangement control mode 324 to the regulation mode 322. The pump regulator 304 can subsequently turn the reconfigurable charge pump 302 off.

Figure 6:
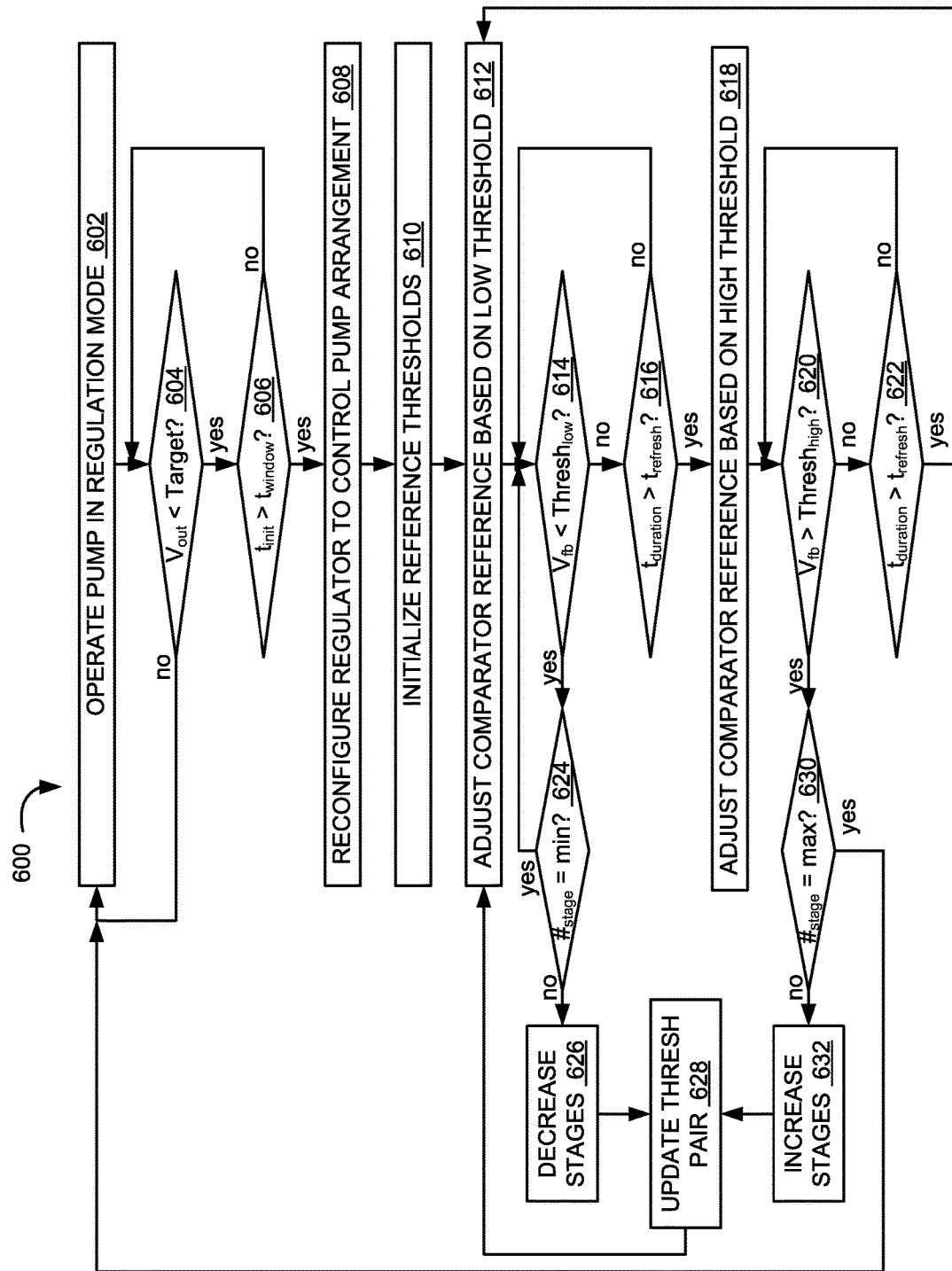
FIG. 6 illustrates an example method of operating an electronic device in accordance with embodiments of the present technology.

FIG. 6 illustrates an example method 600 of operating an electronic device in accordance with embodiments of the present technology. The method 600 can be for operating the electronic device 300 of FIG. 3, such as the reconfigurable charge pump 302 of FIG. 3, the pump regulator 304 of FIG. 4, the arrangement control mechanism 320 of FIG. 4, or a combination thereof. For example, the method 600 can be for operating the reconfigurable charge pump 302 of FIG. 3, the pump regulator 304 of FIG. 4, the arrangement control mechanism 320 of FIG. 4, or a combination thereof according to the timing diagram of FIG. 5.

At block 602, the arrangement control mechanism 320 (e.g., as implemented as a finite state machine (FSM)) can operate the reconfigurable charge pump 302, the pump regulator 304, or a combination thereof in the regulation mode 322 of FIG. 3. In the regulation mode 322, the pump regulator 304 can control on or off state of the reconfigurable charge pump 302.

At block 604, the arrangement control mechanism 320 (e.g., through the pump regulator 304) can evaluate the output voltage 410 of FIG. 4 (e.g., using the monitor level 412 of FIG. 4) with respect to the target level 502 of FIG. 5. While operating in the regulation mode 322, the pump regulator 304 (e.g., using the comparator 402 of FIG. 4 therein) can evaluate the output voltage 410 with respect to the target level 502. For example, when the output voltage 410 is not less than (e.g., greater than or equal to) the target level 502, the reconfigurable charge pump 302 can remain off and the control flow can pass back to the block 602. When, the output voltage 410 falls below the target level 502, the arrangement control mechanism 320, the pump regulator 304, or a combination thereof can turn the pump on and the control flow can pass to block 606.

At block 606, the arrangement control mechanism 320, the pump regulator 304, or a combination thereof (e.g., using a counter) can track and/or evaluate the initial duration 504 of FIG. 5 with respect to the initial time window 506 of FIG. 5. The arrangement control mechanism 320, the pump regulator 304, or a combination thereof can begin tracking or incrementing the initial duration 504 when the reconfigurable charge pump turns on (e.g., when the output voltage 410 falls below the target level 502). When the initial duration 504 does not exceed the initial time window 506, the electronic device 300 can continue to operate in the regulation mode 322, and the control flow can return to block 604. When the initial duration 504 exceeds the initial time window 506 (e.g., for a loading condition), the control flow can pass to block 608.

At block 608, the arrangement control mechanism 320 can repurpose (e.g., based on a state, a switch, a stored value, a flag, etc.) the reconfigurable charge pump 302, the pump regulator 304, or a combination thereof to control arrangements or connections between the pump units 306. For example, the arrangement control mechanism 320 can generate the reconfiguration output 508 of FIG. 5 when the initial duration 504 exceeds the initial time window 506. Accordingly, the reconfigurable charge pump 302, the pump regulator 304, or a combination thereof can operate in the arrangement control mode 324 of FIG. 3 instead of the regulation mode 322.

At block 610, the arrangement control mechanism 320 can load or access initial set of thresholds for adjusting the reference level 414 of FIG. 4. The arrangement control mechanism 320 can load or access the threshold set 510 of FIG. 5 used to adjust the reference level 414. For example, the arrangement control mechanism 320 can access or load the high threshold 512 of FIG. 5 and/or the low threshold 514 of FIG. 5 corresponding to the stage count 312 being implemented at that moment (e.g., based on accessing a counter, an output from the charge pump, etc.).

At block 612, the arrangement control mechanism 320 can adjust the reference level 414 according to the low threshold 514. The arrangement control mechanism 320 can adjust the reference level 414 (e.g., based on operating relays or switches to connect the reference port of the comparator 402 to the corresponding voltage source or level) for comparing the output voltage 410 to a lower limit of an operating range designated for the stage count 312.

At block 614, the arrangement control mechanism 320 (e.g., using the comparator 402 in the pump regulator 304) can compare the output voltage 410 or a derivation thereof (e.g., the monitor level 412) to the low threshold 514. For example, when the monitor level 412 is not below the low threshold 514 (e.g., the output voltage 410 is within the designated range for the stage count 312), the arrangement control mechanism 320 can maintain the stage count 312 and the control flow can pass to block 616.

At block 616, the arrangement control mechanism 320 (e.g., using a timer or a counter) can track and evaluate an evaluation duration with respect to the threshold update window 516 of FIG. 5. When the evaluation duration for the low threshold 514 does not exceed the threshold update window 516, the arrangement control mechanism 320 can continue to evaluate the monitor level 412 with respect to the low threshold 514. When the evaluation duration exceeds the threshold update window 516, the control flow can pass to block 618.

At block 618, the arrangement control mechanism 320 can adjust the reference level 414 according to the high threshold 512. The arrangement control mechanism 320 can adjust the reference level 414 (e.g., based on operating relays or switches to connect the reference port of the comparator 402 to the corresponding voltage source or level) for comparing the output voltage 410 to an upper limit of the operating range designated for the stage count 312.

At block 620, the arrangement control mechanism 320 (e.g., using the comparator 402 in the pump regulator 304) can compare the output voltage 410 or a derivation thereof (e.g., the monitor level 412) to the high threshold 512. For example, when the monitor level 412 is not above the high threshold 512 (e.g., the output voltage 410 is within the designated range for the stage count 312), the arrangement control mechanism 320 can maintain the stage count 312 and the control flow can pass to block 622.

At block 622, the arrangement control mechanism 320 (e.g., using a timer or a counter) can track and evaluate an evaluation duration with respect to the threshold update window 516. The evaluation duration can reset when the reference level 414 adjusts. When the evaluation duration for the high threshold 512 does not exceed the threshold update window 516, the arrangement control mechanism 320 can continue to evaluate the monitor level 412 with respect to the high threshold 512. When the evaluation duration exceeds the threshold update window 516, the control flow can pass to block 612.

As discussed above (between blocks 612-622), the arrangement control mechanism 320 can use the pump regulator 304 (e.g., using the comparator 402 therein) to evaluate the output voltage 410 to the range designated for the stage count 312. Based on adjusting the reference level 414 between high threshold 512 and the low threshold 514, the pump regulator 304 can be repurposed to evaluate the output voltage 410 with respect to a range. Further, in some embodiments, control of the stage count 312 can be performed with minimal additional hardware (e.g., by using the arrangement control mechanism 320 implemented as a finite state machine (FSM) to repurpose the existing charge pump regulator). The stage count 312 can be maintained as long as the output voltage 410 remains within the designated range. The stage count 312 can be adjusted when the output voltage 410 is outside of the designated range (e.g., for block 626 and/or block 632).

For example, when the monitor level 412 is below the low threshold 514 (e.g., as determined at block 614), the control flow can pass to block 624. Also for example, when the monitor level 412 is above the high threshold 512 (e.g., as determined at block 620), the control flow can pass to block 630.

At blocks 624 and 630, the arrangement control mechanism 320 can check for special cases. For example, at block 624, the arrangement control mechanism 320 can check whether the stage count 312 is at a minimum number (e.g., N=1). When the stage count 312 is already at the minimum, the control flow can pass to block 614 and continually operate in the corresponding stage count 312. Also for example, at block 630, the arrangement control mechanism 320 can check whether the stage count 312 is at a maximum number (e.g., N=MAX). When the stage count 312 is already at the maximum possible limit (e.g., with the output voltage 410 exceeding the upper limit, which matches the target level 502), the control flow can pass to block 602, thereby operating the reconfigurable charge pump 302 and/or the pump regulator 304 in the regulation mode 322 instead of the arrangement control mode 324. The pump regulator 304 can further turn the reconfigurable charge pump 302 off based on or before transitioning to block 602, or at a later time.

Outside of the special cases, the arrangement control mechanism 320 can update or change the connections between the pump units 306 within the reconfigurable charge pump 302 (thereby adjusting the stage count 312) according to the corresponding determinations (e.g., at block 614 or 620). For example, at block 626, the arrangement control mechanism 320 can adjust the connections (e.g., based on operating relays, switches, etc.) to decrease the stage count 312 to the next sequential number (e.g., based on a factor of 2) when the monitor level 412 is below the low threshold 514 and the stage count 312 is not at the minimum limit. Also for example, at block 632, the arrangement control mechanism 320 can adjust the connections to increase the stage count 312 to the next sequential number (e.g., based on a factor of 2) when the monitor level 412 is above the high threshold 512 and the stage count 312 is not at the maximum limit.

After updating the stage count 312, at block 628, the arrangement control mechanism 320 can update the high threshold 512 and the low threshold 514 according to the updated value of the stage count 312. For example, when the stage count 312 increases, the arrangement control mechanism 320 can set update the low threshold 514 to be the same as the high threshold 512, and subsequently update the high threshold 512 to the next higher level in the threshold set 510. Also for example, when the stage count 312 decreases, the arrangement control mechanism 320 can update the high threshold 512 to the low threshold 514, and subsequently update the low threshold 514 to the next lower level in the threshold set 510. After updating the thresholds, the control flow can pass to block 612, and the output voltage 410 can be evaluated with respect to the updated range and the updated stage count 312.

Based on implementing the arrangement control mechanism 320 as a finite state machine (FSM), the pump regulator 304 can be repurposed to control the stage count 312 without relying on the firmware Eliminating the use of the firmware provides increased processing capacity/speed (e.g., at macro level) for the electronic device 300 since the firmware can perform other tasks instead of being occupied in controlling the stage count 312 and the required monitoring functions. Further, loop delay associated with the firmware interaction can be eliminated, thereby increasing the processing speed for the reconfigurable charge pump 302. Removal of the delay can further lead to faster rise time for the output voltage 410. Moreover, the arrangement control mechanism 320 and the pump regulator 304 can continuously monitor the output voltage 410 and understand the output current loading of the reconfigurable charge pump 302 (e.g., using the threshold levels to update the reference level). Accordingly, an appropriate stage count can be implemented based on the output current loading, thereby increasing the output efficiency of the reconfigurable charge pump 302 (e.g., increasing the current and power efficiency).

Figure 7:
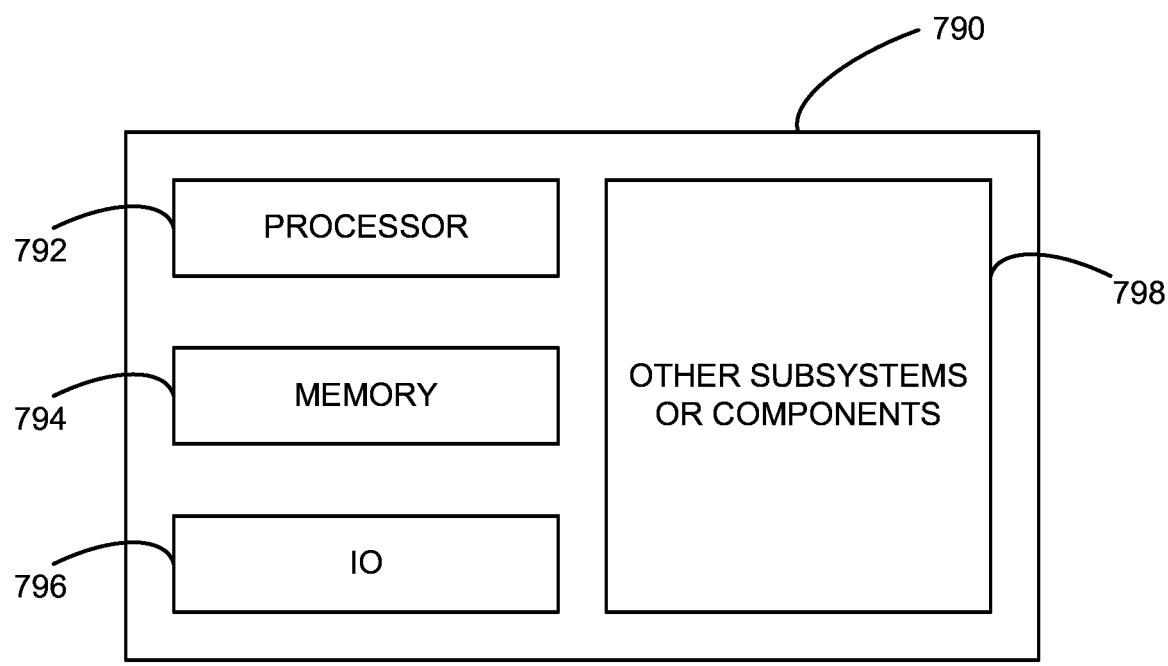
FIG. 7 is a schematic view of a system that includes an electronic device in accordance with embodiments of the present technology.

FIG. 7 is a block diagram illustrating a system that incorporates a semiconductor device in accordance with embodiments of the present technology. Any one of the semiconductor devices having the features described above with reference to FIGS. 1-6 can be incorporated into any of a myriad of larger and/or more complex systems, a representative example of which is system 790 shown schematically in FIG. 7. The system 790 can include a processor 792, a memory 794 (e.g., SRAM, DRAM, flash, such as FLASH NAND and/or FLASH NOR, PRAM, CBRAM, STT-RAM, MRAM, other volatile and/or non-voltaile memory technologies, and/or other memory devices), input/output devices 796, and/or other subsystems or components 798. The semiconductor assemblies, devices, and device packages described above with reference to FIGS. 1-6 can be included in any of the elements shown in FIG. 7. The resulting system 790 can be configured to perform any of a wide variety of suitable computing, processing, storage, sensing, imaging, and/or other functions. Accordingly, representative examples of the system 790 include, without limitation, computers and/or other data processors, such as desktop computers, laptop computers, Internet appliances, hand-held devices (e.g., palm-top computers, wearable computers, cellular or mobile phones, personal digital assistants, music players, etc.), tablets, multi-processor systems, processor-based or programmable consumer electronics, network computers, and minicomputers. Additional representative examples of the system 790 include lights, cameras, vehicles, etc. With regard to these and other examples, the system 790 can be housed in a single unit or distributed over multiple interconnected units, e.g., through a communication network. The components of the system 790 can accordingly include local and/or remote memory storage devices and any of a wide variety of suitable computer-readable media.

From the foregoing, it will be appreciated that specific embodiments of the present technology have been described herein for purposes of illustration, but that various modifications may be made without deviating from the disclosure. In addition, certain aspects of the disclosure described in the context of particular embodiments may be combined or eliminated in other embodiments. Further, while advantages associated with certain embodiments have been described in the context of those embodiments, other embodiments may also exhibit such advantages. Not all embodiments need necessarily exhibit such advantages to fall within the scope of the present disclosure. Accordingly, the disclosure and associated technology can encompass other embodiments not expressly shown or described herein.

We claim:

1. An electronic device, comprising:
    a reconfigurable charge pump including pump units that can be arranged differently for varying levels of an output voltage generated by the reconfigurable charge pump;
    a pump regulator coupled to the reconfigurable charge pump, the pump regulator configured to monitor the output voltage and turn the reconfigurable charge pump on or off based on the output voltage; and
    an arrangement control mechanism coupled to the pump regulator, the arrangement control mechanism configured to:
        repurpose the pump regulator based on the output voltage, wherein the pump regulator is repurposed to control electrical connections between the pump units according to the arrangement control mechanism, and
        generate a mode output based on the output voltage or a derivation thereof, wherein the mode output controls the pump regulator.

2. The electronic device of claim 1 wherein the arrangement control mechanism is configured to generate the mode output based on comparing the output voltage or the derivation thereof to a set of threshold levels.

3. The electronic device of claim 2 wherein the arrangement control mechanism is configured to compare the output voltage or the derivation thereof to a different level within the set of threshold levels after a threshold update window.

4. The electronic device of claim 2 wherein:
    the pump regulator includes a comparator connected to a reference level and configured to evaluate the output voltage or the derivation thereof according to the reference level; and
    while operating the pump regulator in the arrangement control mode, the arrangement control mechanism is configured to adjust the reference level based on the set of threshold levels.

5. The electronic device of claim 2 wherein the set of threshold levels include a high threshold and a low threshold for each set of connections between the pump units.

6. The electronic device of claim 5 wherein the arrangement control mechanism is configured to generate the mode output for increasing a stage count when the output voltage or the derivation thereof is greater than the high threshold, wherein the stage count represents a quantity of the pump units that are electrically connected in series as a series set.

7. The electronic device of claim 6 wherein the arrangement control mechanism is configured to:
    increase the stage count according to a predetermined factor or interval; and
    update the high threshold and the low threshold, wherein an updated low threshold is equal to the high threshold used to increase the stage count.

8. The electronic device of claim 5 wherein the arrangement control mechanism is configured to operate the pump regulator to control the on-state or the off-state when a stage count is equal to a maximum limit and the output voltage or the derivation thereof is greater than the high threshold corresponding to the stage count, wherein the stage count represents a quantity of the pump units that are electrically connected in series as a series set.

9. The electronic device of claim 8 wherein the pump regulator is configured to designate the off-state for the reconfigurable charge pump after changing to control the on-state or the off-state instead of generating the mode output.

10. The electronic device of claim 5 wherein the arrangement control mechanism is configured to generate the mode output for decreasing a stage count when the output voltage or the derivation thereof is less than the low threshold, wherein the stage count represents a quantity of the pump units that are electrically connected in series as a series set.

11. The electronic device of claim 10 wherein the arrangement control mechanism is configured to:
decrease the stage count according to a predetermined factor or interval; and
update the high threshold and the low threshold, wherein an updated high threshold is equal to the low threshold used to decrease the stage count.

12. The electronic device of claim 5 wherein the arrangement control mechanism is configured to maintain a stage count when the output voltage or the derivation thereof is between the low threshold and the high threshold, wherein the stage count represents a quantity of the pump units that are electrically connected in series as a series set.

13. The electronic device of claim 1 wherein the arrangement control mechanism is implemented as a finite state machine.

14. The electronic device of claim 1 wherein the reconfigurable charge pump is configured to change the electrical connection between the pump units based on the arrangement control mechanism instead of firmware.

15. The electronic device of claim 1 wherein the reconfigurable charge pump is implemented as an integrated circuit.

* * * * *